United States Patent [19]
Kim

[11] Patent Number: 5,881,175
[45] Date of Patent: Mar. 9, 1999

[54] METHOD AND APPARATUS FOR ENCODING AN IMAGE SIGNAL BY USING THE CONTOUR SIGNAL THEREOF

[75] Inventor: Jong-Il Kim, Seoul, Rep. of Korea

[73] Assignee: Daewoo Electronics Co., Ltd., Seoul, Rep. of Korea

[21] Appl. No.: 869,557

[22] Filed: Jun. 5, 1997

[30] Foreign Application Priority Data

Jun. 7, 1996 [KR] Rep. of Korea ............ 1996-20286
Aug. 9, 1996 [KR] Rep. of Korea ............ 1996-33180

[51] Int. Cl.⁶ ........................................... G06K 9/36
[52] U.S. Cl. ................................................. 382/242
[58] Field of Search ........................... 382/232, 236, 382/238, 240, 242, 248, 250; 358/432, 433; 348/384, 394, 395, 400, 401–404, 407–416, 420–421, 425, 430, 431, 699

[56] References Cited

U.S. PATENT DOCUMENTS

| | | | |
|---|---|---|---|
| 5,633,685 | 5/1997 | Cho et al. | 348/242 |
| 5,691,769 | 11/1997 | Kim | 348/403 |
| 5,710,838 | 1/1998 | Jung | 382/242 |
| 5,737,449 | 4/1998 | Lee | 382/242 |
| 5,757,382 | 5/1998 | Lee | 382/242 |
| 5,774,596 | 6/1998 | Kim | 382/242 |
| 5,778,100 | 7/1998 | Chen et al. | 382/236 |
| 5,793,893 | 8/1998 | Kim | 382/242 |

*Primary Examiner*—Jose L. Couso
*Attorney, Agent, or Firm*—Pennie & Edmonds LLP

[57] ABSTRACT

In an encoding method for use in an encoder to encode an image signal including an object having object pixels, a background having background pixels and a contour signal representing the contour of the object, the contour signal is first encoded based on mask data having first and second binary values to designate an object pixel and a background pixels, respectively and then decoded to generate a decoded contour. In the mean time, a primary padded image signal obtained by applying a primary padding on the image signal is divided into multiplicity of equal-sized primary padded blocks and then each of the primary padded blocks is defined either as a contour block or as an object block based on the decoded contour to thereby select contour blocks and object blocks. Thereafter, each of the contour blocks are masked based on the decoded contour to form each of corresponding masked blocks by replacing every pixel value inside the decoded contour with a first binary value, respectively and every pixel value outside the decoded contour with a second binary value, respectively to thereby supply a multiplicity of corresponding masked blocks. And then, each of the contour blocks are padded based on the mask data and said each of corresponding masked blocks, thereby providing padded contour blocks and in turn the padded contour blocks and the object blocks are encoded to thereby provide an encoded texture signal of the image signal.

19 Claims, 5 Drawing Sheets

|  | N |  |  |
|---|---|---|---|
| 70 | 71 | 69 | 72 |
| 30 | 65 | 63 | 65 |
| 28 | 34 | 67 | 68 |
| 32 | 39 | 36 | 35 |

|  |  |  |  |
|---|---|---|---|
| 0 | 0 | 0 | 0 |
| 1 | 0 | 0 | 0 |
| 1 | 0 | 1 | 0 |
| 1 | 1 | 1 | 0 |

|  |  |  |  |
|---|---|---|---|
| 0 | 0 | 0 | 0 |
| 30 | 0 | 0 | 0 |
| 28 | 34 | 0 | 0 |
| 32 | 39 | 36 | 0 |

C — LM — A — LN — B, 221

METHOD AND APPARATUS FOR ENCODING AN IMAGE SIGNAL BY USING THE CONTOUR SIGNAL THEREOF

FIELD OF THE INVENTION

The present invention relates to a method and apparatus for encoding an image signal; and, more particularly, to a method and apparatus for encoding an image signal by utilizing the contour signal thereof.

DESCRIPTION OF THE PRIOR ART

In a digitally televised system such as video-telephone, teleconference or high definition television system, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially, in the case of such low bit-rate video signal encoders as video-telephone and teleconference systems.

One of such methods for encoding image signals for a low bit-rate encoding system employs the so-called object-oriented analysis-synthesis coding technique (see Michael Hotter, "Object-Oriented Analysis-Synthesis Coding Based On Moving Two-Dimensional Objects", *Signal Processing: Image Communication*, 2, 409–428(1990)). In the object-oriented analysis-synthesis coding technique, an input image signal is divided into the objects; and three sets of parameters for defining motion, contour and pixel data of each object are processed through different encoding channels.

In processing a digital image frame signal, a transform coding technique is normally employed for reducing spatial redundancies contained therein. According to a conventional coding technique, digital image frame signal data is converted into a set of transform coefficients on a block-by-block basis, e.g., 8×8 arrays of pixels. One of the most frequently used transform coding methods is a discrete cosine transform (DCT) method. This method is described in, e.g., Chen and Pratt, "Scene Adaptive Coder", *IEEE Transactions on Communications*, COM-32, No. 3, pp. 225–232 (March 1984).

Before a DCT coding technique is applied on a digital image frame signal on a block-by-block basis, it is desirable to perform a primary padding on the digital image frame signal in order to prevent coding efficiency from being degraded due to high frequency pixel data in a background or a region outside an object region in the digital image frame signal. Therefore, each pixel value in the background of the digital image frame signal is normally padded with, e.g., 0 or a value derived from the pixel values in the object within the digital image frame signal. For example, in a typical conventional mean padding method, each pixel value in the background is padded with an average value of all pixel values in the object region.

However, in a DCT process for a contour block which has background pixels and object pixels, 0 or the average pixel value may be quite different from each value of the object pixels in the contour block, resulting in a coding efficiency degradation.

On the other hand, it is known that a repetitive padding method is more effective than the above techniques. A repetitive padding method for a digital image frame signal normally includes the following five steps. In a first step, each pixel located outside a contour of an object in the digital image frame signal is treated as a pixel of zero value. In a second step, each horizontal line of the object region is scanned, wherein each scan line can be segmented into two kinds of line segments: zero segments in which all the pixels within each segment have zero values and non-zero segments where all the pixels within each segment have non-zero values.

If there are no non-zero segments on a scan line, nothing will be done to it; and if otherwise, there can be two different cases for a zero segment on the scan line: the zero segment can be positioned either between an end point of the scan line and an end point of a non-zero segment, or, between end points of two different non-zero segments. In the first case, all the values of the pixels in the zero segment will be filled with the pixel value at the end point of the non-zero segment. In the second case, all the values of the pixels in the zero segment will be filled with the average value of the pixel values at the two end points.

In a third step, each vertical line of the object region is scanned and the same procedure as described in the second step above is performed on each vertical scan line. In a fourth step, if a pixel of zero value can be filled in by both the second and third steps, the final value for the pixel of zero value is filled with the average value of the two values obtained in the second and the third steps.

In a final step, for any one of the remaining pixels of zero value in the digital image frame signal, a horizontal scan is carried out to find a closest non-zero pixel on the same horizontal line; and a vertical scan, to find a closest non-zero pixel on the same vertical line. Then, the zero value of each of the remaining pixels is replaced by the average value of the corresponding two horizontally and vertically closest non-zero pixel values.

However, in the second and third steps of the repetitive padding method described above, the average pixel value of the two end points also may be a degraded value since the pixel value at one end point of a scan line may be quite different from the pixel value at the other end point of the scanning line.

Referring to FIG. 1, there is a schematic diagram illustrating a part of the conventional repetitive padding procedure for a digital image frame signal, wherein the hatched region represents an object having object pixels and the un-hatched region represents a background having background pixels.

In the conventional repetitive padding procedure, an average pixel value of pixels at two end points, e.g., points Pa and Pb on a horizontal scanning line L1 and a value of pixel at a point Pc on another horizontal scanning line L2 connected to an object in the digital image frame signal are used to obtain values to be padded in the background region of a contour block 100. However, in the above case, if the pixel values at the end points Pb and Pc are quite different from object pixel values within the contour block 100, the values to be padded in the background region of the contour block 100 may be quite different from the object pixel values within the contour block 100.

Therefore, a conventional encoding technique employing a conventional padding method may entail unnecessary and undesirable data in the background region of a digital image frame signal, thereby lowering the data compression efficiency.

SUMMARY OF THE INVENTION

It is, therefore, a primary object of the present invention to provide a method and apparatus for effectively encoding an image signal by utilizing the contour signal thereof.

In accordance with the present invention, there is provided a method for use in an encoder to encode an image signal based on mask data for the image signal, wherein the image signal includes object pixels within an object and background pixels within a background located outside the object and a contour signal representing the contour of the object and the mask data includes a first binary value used to designate an object pixel and a second binary value used to indicate a background pixel, the method comprising the steps of: (a) encoding the contour signal of the object based on the mask data for the image signal, thereby providing an encoded contour signal; (b) decoding the encoded contour signal, thereby generating a decoded contour of the object; (c) applying primary padding on the image signal, thereby providing a primary padded image signal; (d) dividing the primary padded image signal into a multiplicity of equal-sized primary padded blocks of M×N pixels with M and N being predetermined positive integers, respectively, and defining each of the primary padded blocks either as a contour block or as an object block based on the decoded contour to thereby select contour blocks and object blocks, wherein the contour block is a primary padded block having one or more pixels located both inside and outside the decoded contour and the object block is a primary padded block having pixels located only inside the decoded contour; (e) masking each of the contour blocks based on the decoded contour to form each of corresponding masked blocks by replacing every pixel value inside the decoded contour within said each of the contour blocks with the first binary value and every pixel value outside the decoded contour with the second binary value to thereby supply a multiplicity of corresponding masked blocks; (f) padding each of the contour blocks based on the mask data and said each corresponding masked blocks to thereby provide a multiplicity of padded contour blocks; and (g) encoding the padded contour blocks and the object blocks to thereby provide an encoded texture signal of the image signal.

BRIEF DESCRIPTION OF THE DRAWINGS

The above and other objects and features of the present invention will become apparent from the following description of preferred embodiments given in conjunction with the accompanying drawings, in which:

FIG. 4A shows a contour block having a contour segment of the object, which reveals pixel values included therein;

FIG. 4B shows a masked block obtained based on a decoded contour of the contour, wherein the masked block is located at the same position as the contour block; and FIGS. 4C to 4E depict blocks showing contour block padding procedures for the contour block in accordance with the present invention.

DETAILED DESCRIPTION OF THE PREFERRED EMBODIMENTS

Figure 1:
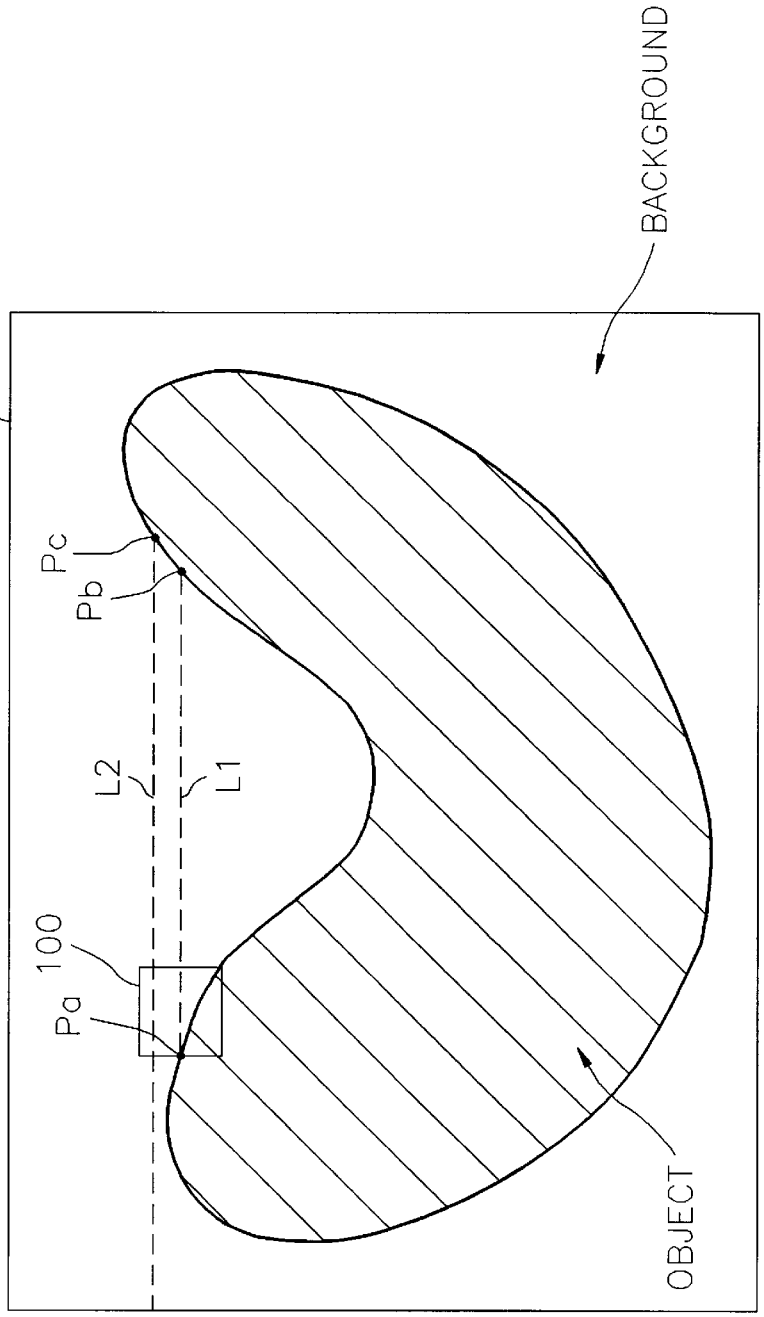
FIG. 1 illustrates a part of a conventional repetitive padding procedure for an image signal.
Figure 2:
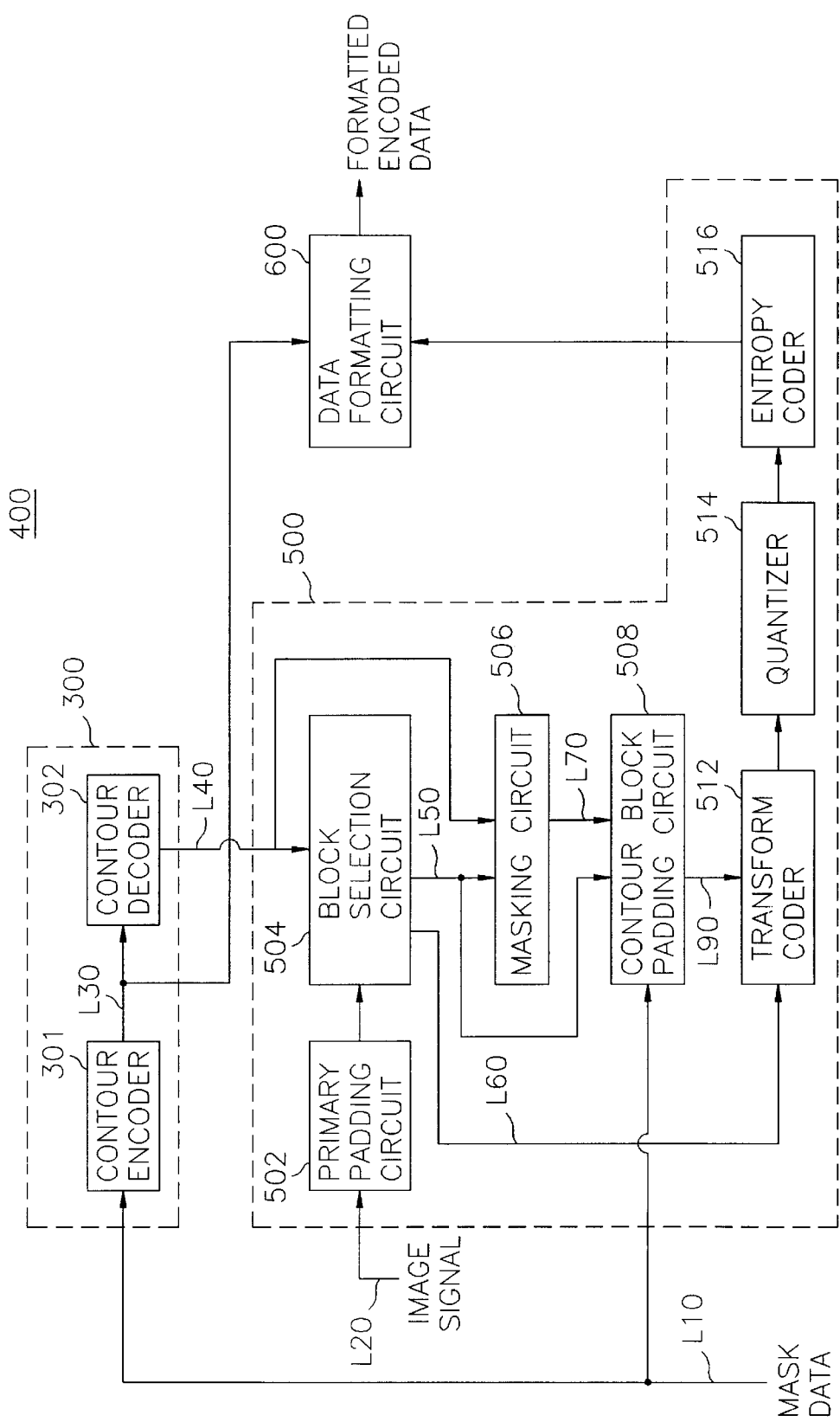
FIG. 2 shows a block diagram of an encoding apparatus to encode an image signal having an object containing a contour thereof in accordance with the present invention.

Referring to FIG. 2, there is shown a block diagram of an encoding apparatus 400 to encode an image signal in accordance with a preferred embodiment of the present invention.

The encoding apparatus 400 comprises a first and a second encoding channels 300 and 500, and a data formatting circuit 600. The first encoding channel 300 includes a contour encoder 301 and a contour decoder 302. And the second encoding channel 500 includes a primary padding circuit 502, a block selection circuit 504, a masking circuit 506, a contour block padding circuit 508, a transform coder 512, a quantizer 514 and an entropy coder 516.

First, an image signal, e.g., a digital image frame signal or a video object plane (VOP) signal in a digital image frame signal is inputted to the primary padding circuit 502 via a line L20. The image signal includes object pixels within an object, background pixels within a background located outside the object, a contour signal representing the contour of the object and mask data having a first binary value and a second binary value, wherein the first binary value, e.g., 1, is used to designate an object pixel and the second binary value, e.g., 0, is used to indicate a background pixel. Therefore, it should be noted here that the contour signal obtained based on the mask data can include data for a size and a position characterizing the shape of the object. The VOP disclosed in Moving Picture Experts Group (MPEG) phase 4 (MPEG 4) can be referred to as an object and a boundary rectangle whose width and height is a smallest multiples of 16 pixels (a macroblock size) surrounding the object.

On the other hand, the mask data for the image signal is inputted to the contour encoder 301 in the first encoding channel 300 and to the contour block padding circuit 508 in the second encoding channel 500 through a line L10.

The contour encoder 301 first forms the contour signal based on the mask data for the image signal. And then, the contour encoder 301 encodes the contour signal by using, e.g., a binary arithmetic code of Joint Photographic Experts Group (JPEG), thereby providing an encoded contour signal. The encoded contour signal is then supplied to the contour decoder 302 and to the data formatting circuit 600 through a line L30. At the contour decoder 302, the encoded contour signal is converted into a decoded contour which, in turn, is transmitted to the block selection circuit 504 and the masking circuit 506 through a line L40.

In the meantime, the primary padding circuit 502 applies primary padding on the image signal inputted thereto through a line L20 by using, e.g., a conventional mean padding method or a conventional repetitive padding method to thereby provide a primary padded image signal to the block selection circuit 504.

The block selection circuit 504 first divides the primary padded image signal into a multiplicity of equal-sized primary padded blocks of M×N pixels with M and N being predetermined positive integers, usually ranging from 8's to 32's and typically 8's, respectively (all of the primary padded blocks in the following examples are assumed to be blocks of 4×4 pixels for simplicity). Thereafter, the block selection circuit 504 superposes the decoded contour on the primary padded blocks and then redefines pixels located inside the decoded contour as redefined object pixels and pixels located outside the decoded contour as redefined background pixels.

And then the block selection circuit 504 defines each of the primary padded blocks either as a contour block or as an object block to thereby select contour blocks to be transmitted to the masking circuit 506 and the contour block padding circuit 508 through a line L50 and object blocks to be transmitted to the transform coder 512 via a line L60, wherein the contour block is a primary padded block having one or more both redefined object pixels and redefined background pixels therein and the object block is a primary padded block having redefined object pixels only. FIG. 4A shows a contour block 200 having a contour segment of the object, which reveals pixel values included therein.

The masking circuit 506 performs masking each of the contour blocks based on the decoded contour to form each of corresponding masked blocks by replacing every pixel value inside the decoded contour within said each of the contour blocks with a first binary value, e.g., 1, respectively and every pixel value outside the decoded contour with a second binary value, e.g., 0, respectively to thereby supply a multiplicity of corresponding masked blocks to the contour block padding circuit 508. For simplicity, from now on, it is assumed that the first binary value is 1 and the second binary value is 0. FIG. 4B shows a masked block 210 obtained based on the decoded contour, wherein the masked block 210 is located at the same position as the contour block 200.

Figure 3:
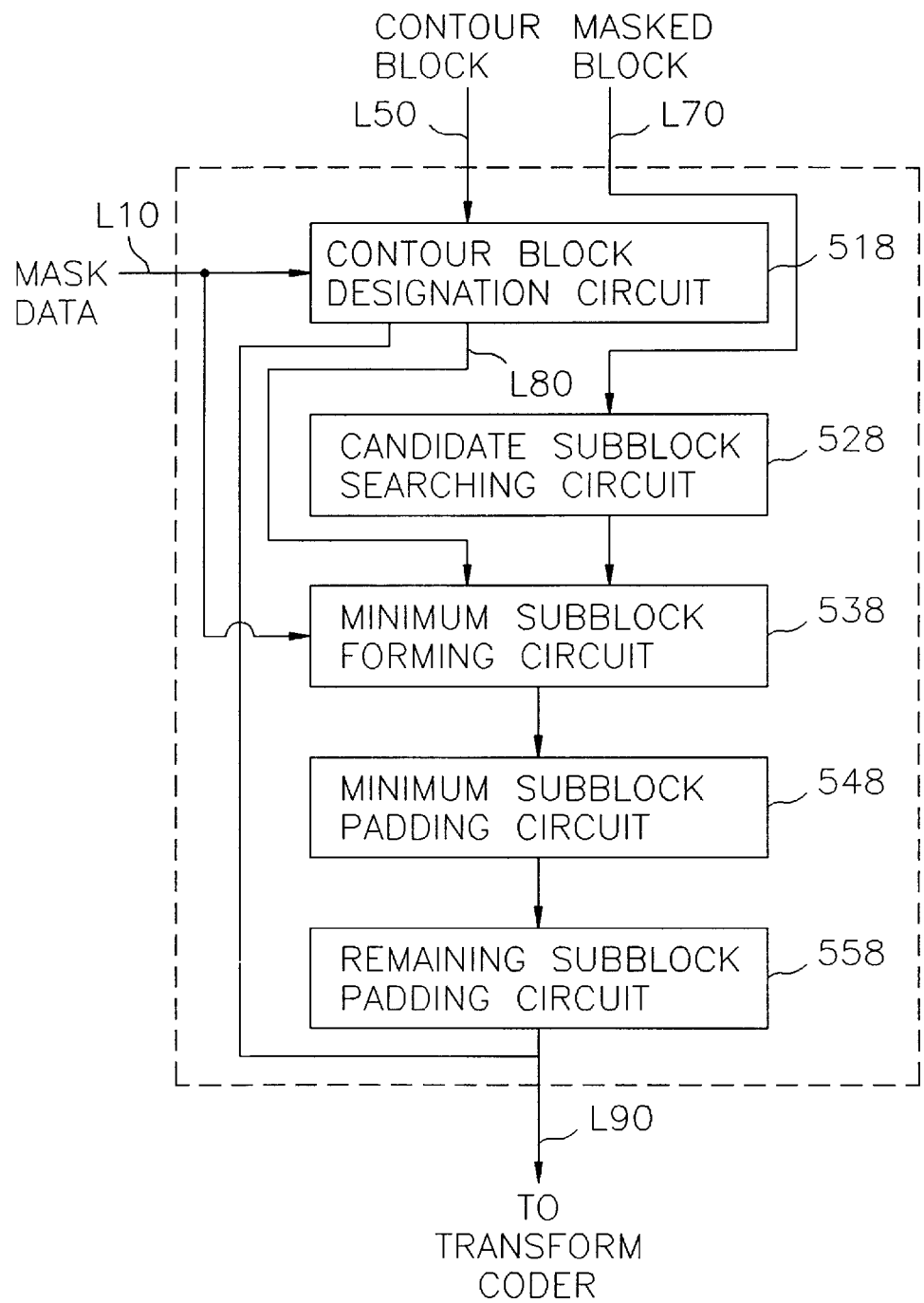
FIG. 3 represents a detailed block diagram of a contour block padding circuit shown in FIG. 2 in accordance with the preferred embodiment of the present invention.

The contour block padding circuit 508 carries out padding each of the contour blocks inputted thereto from the block selection circuit 504 via the line L50 based on the mask data inputted thereto through the line L10 and said each corresponding masked blocks inputted thereto from the masking circuit 506 via the line L70 to thereby provide a multiplicity of padded contour blocks to the transform coder 512 through a line L90. Referring to FIG. 3, there is represented a detailed block diagram of the contour block padding circuit 508 shown in FIG. 2 in accordance with the preferred embodiment of the present invention.

The mask data is inputted to a contour block designation circuit 518 and a minimum subblock forming circuit 538. The contour block designation circuit 518 designates said each of the contour blocks inputted thereto from the block selection circuit 504 either as a first contour block or as a second contour block based on the mask data to thereby provide first contour blocks as padded contour blocks to the transform coder 512 and a plurality of second contour blocks to the minimum subblock forming circuit 538, wherein the first contour block is a contour block having no object pixel therein, hence having no contour segment of the object; and the second contour block is a contour block having one or more object pixels therein, hence having a contour segment of the object.

A candidate subblock searching circuit 528 searches a corresponding candidate subblock within each of the masked blocks inputted thereto from the masking circuit 506 through the line L70 to thereby provide information representing the position and dimensions of the corresponding candidate to the minimum subblock forming circuit 538, wherein the corresponding candidate subblock is a smallest rectangular subblock among subblocks containing all of 1's inside the decoded contour within said each of the masked blocks. Referring back to FIG. 4B, there is illustrated a corresponding candidate subblock 211 within the masked block 210 having a dimension of LM×LN pixels with LM and LN being positive integers, e.g., 3's, not greater than M and N, respectively, and having position characterized by using points, e.g., A, B and C.

Thereafter, the minimum subblock forming circuit 538 forms a minimum subblock within each of the second contour blocks by using the information representing the position and dimension of a corresponding candidate subblock based on the mask data and said each of the second contour blocks inputted thereto, thereby providing a multiplicity of minimum subblocks to a minimum subblock padding circuit 548, wherein each minimum subblock is located at the same position as the corresponding candidate subblock within said each of the second contour blocks and has the same dimension as that of the corresponding candidate subblock and has a contour segment of the object therein and has the same pixel values inside the contour segment as those of said each of the second contour blocks and has zeroes as pixel values outside the contour segment. Referring to FIG. 4C, there is shown a minimum subblock 221 within a second contour block 220 located at the same position as the contour block 200 shown in FIG. 4A.

Figure 4D:
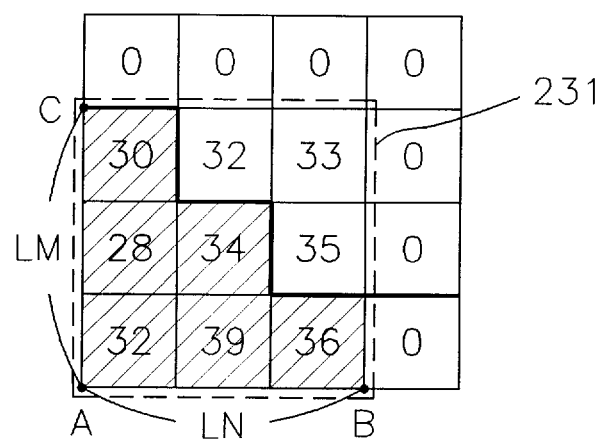

And then, the minimum subblock padding circuit 548 substitutes zeroes outside the contour segment within each of the minimum subblocks with first padded values to form a padded minimum subblock, thereby producing a plurality of padded minimum subblocks. The first padded values are generated by using a distance weighted mean padding method based on object pixel values inside the contour segment in said each of the minimum subblocks. FIG. 4D illustrates a padded minimum subblock 231 obtained by using the minimum subblock 221. Referring to FIG. 4D, an exemplary procedure of a distance weighted mean padding method used to, obtain the padded minimum subblock 231 is described hereinafter. The first padded values 32, 33 and 35 in the padded minimum sub block 231 are calculated as followings:

$$\frac{30 \times 1 + 34 \times 1}{1 + 1} = 32$$

$$\frac{30 \times 2 + 36 \times 2}{2 + 2} = 33$$

$$\frac{34 \times 1 + 36 \times 1}{1 + 1} = 35.$$

Figure 4E:
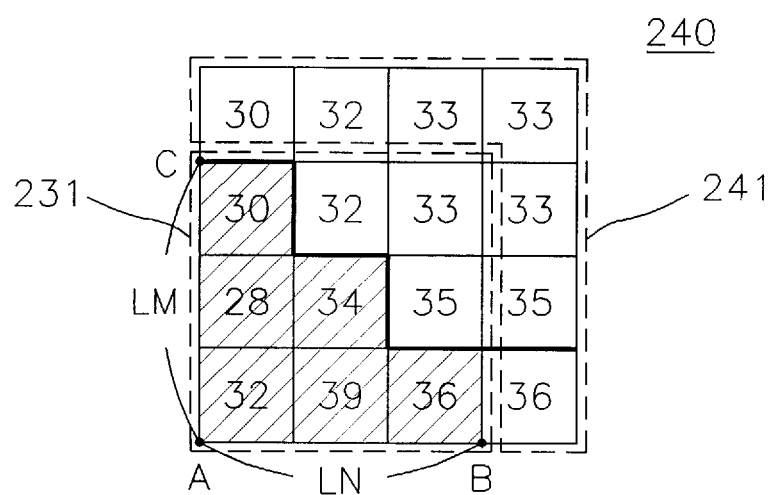

Thereafter, a remaining subblock padding circuit 558 replaces zeroes outside each of the padded minimum subblocks with second padded values to form a corresponding padded remaining subblock remained in said each of the second contour blocks to thereby provide a multiplicity of corresponding padded remaining subblocks and in turn combines said each of the padded minimum subblocks and the corresponding padded remaining subblock to form a padded contour block, thereby providing a multiplicity of padded contour blocks to the transform coder 512 via the line L90. The second padded values are generated by using either a repetitive padding method or a mean padding method based on pixel values in each of the padded minimum subblocks. FIG. 4E depicts a padded contour block 240 including the padded minimum subblock 231 and the padded remaining subblock 241 obtained by using a repetitive padding method.

It should be noted here that a contour in an image signal may not coincide with a decoded contour of the contour. For example, referring back to FIG. 4B, the hatched region and the un-hatched region in the masked block 210 depict a redefined object region including only redefined object pixels therein and a corresponding redefined background region including only redefined background pixels therein, respectively and the bold line therein illustrates a boundary between the redefined object region and the corresponding redefined background region. On the other hand, in FIGS. 4A and 4C to 4E, hatched regions and un-hatched regions depict object regions including only object pixels therein and background regions including only background pixels therein, respectively, and each of bold lines illustrate each of the corresponding boundaries between the object regions and the background regions, respectively. Hence, referring to FIGS. 4A to 4E, it can be understood that the contour and the decoded contour of the object in the image signal may not coincide with each other.

If minimum subblock padding at the minimum subblock padding circuit 548 is carried out by using a repetitive padding method based on the decoded contour, there may be involved a background pixel value, e.g., 67 in the contour block 200 as a redefined object pixel. In this case, the background pixel value 67 is used in repetitive padding procedure for a minimum subblock to thereby introduce undesirable pixel values in the corresponding redefined background region. As a result, the encoding efficiency of the padded contour block having the background pixel as the redefined object pixel therein is decreased in the following encoding process. Therefore, in accordance with the present invention, the decoded contour is only used to search a candidate subblock and all of the padding procedures described above are carried out by using the contour.

Thereafter, the transform coder 512 transforms the padded contour blocks inputted thereto from the remaining subblock padding circuit 558 and the object blocks inputted thereto from the block selection circuit 504 into sets of transform coefficients by employing, e.g., a DCT on a block-by block basis, a block being a block of M×N pixels and then provides the sets of transform coefficients to the quantizer 514.

At the quantizer 514, the sets of transform coefficients are quantized by using a known quantization method. And then the sets of quantized transform coefficients are fed to the entropy coder 516. The entropy coder 516 encodes the sets of quantized transform coefficients by using, e.g., a combination of run-length and variable length coding techniques to provide an encoded texture signal of the image signal to be transmitted to the data formatting circuit 600.

The data formatting circuit 600 formats the encoded contour signal from the contour encoder 301 in the first encoding channel 300 and the encoded texture signal from the entropy coder 516 in the second encoding channel 500 to thereby provide a formatted encoded data to a transmitter (not shown) for the transmission thereof.

In accordance with another preferred embodiment of the present invention, each of the padded minimum subblocks is directly inputted to the transform coder 512 as a padded contour block together with the corresponding information representing the position and dimension of said each of the padded minimum subblocks.

In this case, object blocks are processed at the transform coder 512, the quantizer 514 and the entropy coder 516 in a same manner as the case that padded contour blocks are inputted to the transform coder 512 from the remaining subblock padding circuit 558 but the padded contour block inputted to the transform coder 512 from the minimum subblock padding circuit 548 is processed at the transform coder 512, the quantizer 514 and the entropy coder 516 only for said each of the padded minimum subblocks based on the corresponding information representing the position and dimension of said each of the padded minimum subblocks.

While the present invention has been described with respect to the particular embodiments, it will be apparent to those skilled in the art that various changes and modifications may be made without departing from the spirit and scope of the invention as defined in the following claims.

What is claimed is:

1. A method for use in an encoder to encode an image signal based on mask data for the image signal, wherein the image signal includes object pixels within an object and background pixels within a background located outside the object and a contour signal representing the contour of the object and the mask data includes a first binary value used to designate an object pixel and a second binary value used to indicate a background pixel, the method comprising the steps of:

(a) encoding the contour signal of the object based on the mask data for the image signal, thereby providing an encoded contour signal;

(b) decoding the encoded contour signal, thereby generating a decoded contour of the object;

(c) applying primary padding on the image signal, thereby providing a primary padded image signal;

(d) dividing the primary padded image signal into a multiplicity of equal-sized primary padded blocks of M×N pixels with M and N being predetermined positive integers, respectively, and defining each of the primary padded blocks either as a contour block or as an object block based on the decoded contour to thereby select contour blocks and object blocks, wherein the contour block is a primary padded block having one or more pixels located both and outside the decoded contour and the object block is a primary padded block having pixels located only inside the decoded contour;

(e) masking each of the contour blocks based on the decoded contour to form each of corresponding masked blocks by replacing every pixel value inside the decoded contour within said each of the contour blocks with the first binary value and every pixel value outside the decoded contour with the second binary value to thereby supply a multiplicity of corresponding masked blocks;

(f) padding each of the contour blocks based on the mask data and said each corresponding masked blocks to thereby provide a multiplicity of padded contour blocks; and (g) encoding the padded contour blocks and the object blocks to thereby provide an encoded texture signal of the image signal.

2. The method according to claim 1, wherein the image signal is either a digital image frame signal or a video object plane signal in a digital image frame signal.

3. The method according to claim 2, wherein the first binary value is 1 and the second binary value is zero.

4. The method according to claim 2, wherein the primary padding is carried out by using either a mean padding method or a repetitive padding method.

5. The method according to claim 4, wherein said step (d) includes the steps of:

(d1) dividing the primary padded image signal into the multiplicity of equal-sized primary padded blocks of M×N pixels;

(d2) superposing the decoded contour on the primary padded blocks and then redefining pixels located inside the decoded contour as redefined object pixels and pixels located outside the decoded contour as redefined background pixels; and (d3) block defining each of the primary padded blocks as either the contour block or the object block to thereby select the contour blocks and the object blocks.

6. The method according to claim 5, wherein said step (f) includes the steps of:

(f1) designating said each of the contour blocks as either a first contour block or a second contour block to thereby provide first contour blocks as the padded contour blocks and a plurality of second contour blocks based on the mask data, wherein the first contour block is a contour block having no object pixel therein, hence having no contour segment of the object and the second contour block is a contour block having one or more object pixels therein, hence having a contour segment of the object;

(f2) searching a corresponding candidate subblock within each of the masked blocks to thereby provide information representing positions and dimensions of corresponding candidate subblocks, wherein the candidate subblock is a smallest rectangular subblock among subblocks containing all of the first binary values inside the decoded contour within said each of the masked blocks;

(f3) forming a minimum subblock within each of the second contour blocks by using the information representing the position and dimension of a corresponding candidate subblock based on the mask data and said each of the second contour blocks to thereby provide a multiplicity of minimum subblocks, wherein each minimum subblock is located at the same position as the corresponding candidate subblock within said each of the second contour blocks, has the same dimension as the corresponding candidate subblock, has a contour segment of the object therein, has the same pixel values as those inside the contour segment of said each of the second contour blocks and has the second binary values as pixel values outside the contour segment therein;

(f4) substituting the second binary values outside the contour segment within each of the minimum subblocks with first padded values to form a padded minimum subblock, thereby producing a plurality of padded minimum subblocks;

(f5) replacing the second binary values outside each of the padded minimum subblocks with second padded values to form a corresponding padded remaining subblock remained in said each of the second contour blocks, thereby providing a multiplicity of corresponding padded remaining subblocks; and (f6) combining said each of the padded minimum subblocks and the corresponding padded remaining subblock to form a padded contour block, thereby providing a multiplicity of padded contour blocks.

7. The method according to claim 6, wherein the first padded values are generated by using a distance weighted mean padding method based on the pixel values inside the contour segment in said each of the minimum subblocks.

8. The method according to claim 7, wherein the second padded values are generated by using a repetitive padding method based on the pixel values in said each of the padded minimum subblocks.

9. The method according to claim 8, wherein each of the padded minimum subblocks is directly produced as a padded contour block together with the corresponding information representing the position and the dimension of said each of the padded minimum subblocks without going through said steps (f5) and (f6).

10. The method according to claim 1, wherein said step (g) includes the steps of:

(g1) transform coding each of the padded contour blocks produced from said step (f) and each of the object blocks provided from said step (d), thereby providing sets of transform coefficients;

(g2) quantizing the sets of transform coefficients, thereby providing sets of quantized transform coefficients; and (g3) entropy coding the sets of quantized transform coefficients, thereby providing the encoded texture signal of the image signal.

11. An encoding apparatus to encode an image signal based on mask data for the image signal, wherein the image signal includes object pixels within an object and background pixels within a background located outside the object and a contour signal representing the contour of the object and the mask data includes a first binary value used to designate an object pixel and a second binary value used to indicate a background pixel, comprises:

means for encoding the contour signal of the object based on the mask data for the image signal, thereby providing an encoded contour signal;

means for decoding the encoded contour signal, thereby generating a decoded contour of the object;

means for applying primary padding on the image signal, thereby providing a primary padded image signal;

means for dividing the primary padded image signal into a multiplicity of equal-sized primary padded blocks of M×N pixels with M and N being predetermined positive integers, respectively, and defining each of the primary padded blocks either as a contour block or as an object block based on the decoded contour to thereby select contour blocks and object blocks, wherein the contour block is a primary padded block having one or more pixels located both and outside the decoded contour and the object block is a primary padded block having pixels located only inside the decoded contour;

means for masking each of the contour blocks based on the decoded contour to form each of corresponding masked blocks by replacing every pixel value inside the decoded contour within said each of the contour blocks with the first binary value and every pixel value outside the decoded contour with the second binary value to thereby supply a multiplicity of corresponding masked blocks;

means for padding each of the contour blocks based on the mask data and said each corresponding masked blocks to thereby provide a multiplicity of padded contour blocks; and means for encoding the padded contour blocks and the object blocks to thereby provide an encoded texture signal of the image signal.

12. The apparatus according to claim 11, wherein the image signal is either a digital image frame signal or a video object plane signal in a digital image frame signal.

13. The apparatus according to claim 12, wherein the first binary value is 1 and the second binary value is zero.

14. The apparatus according to claim 12, wherein the primary padding is carried out by using either a mean padding method or a repetitive padding method.

15. The apparatus according to claim 14, wherein said dividing means includes:

means for dividing the primary padded image signal into the multiplicity of equal-sized primary padded blocks of M×N pixels;

means for superposing the decoded contour on the primary padded blocks and then redefining pixels located inside the decoded contour as redefined object pixels and pixels located outside the decoded contour as redefined background pixels; and means for block defining each of the primary padded blocks as either the contour block or the object block to thereby select the contour blocks and the object blocks.

16. The apparatus according to claim 15, wherein said padding means includes:

means for designating said each of the contour blocks as either a first contour block or a second contour block to thereby provide first contour blocks as the padded contour blocks and a plurality of second contour blocks based on the mask data, wherein the first contour block is a contour block having no object pixel therein, hence having no contour segment of the object and the second contour block is a contour block having one or more object pixels therein, hence having a contour segment of the object;

means for searching a corresponding candidate subblock within each of the masked blocks to thereby provide information representing positions and dimensions of corresponding candidate subblocks, wherein the candidate subblock is a smallest rectangular subblock among subblocks containing all of the first binary values inside the decoded contour within said each of the masked blocks;

means for forming a minimum subblock within each of the second contour blocks by using the information representing the position and dimension of a corresponding candidate subblock based on the mask data and said each of the second contour blocks to thereby provide a multiplicity of minimum subblocks, wherein each minimum subblock is located at the same position as the corresponding candidate subblock within said each of the second contour blocks, has the same dimension as the corresponding candidate subblock, has a contour segment of the object therein, has the same pixel values as those inside the contour segment of said each of the second contour blocks and has the second binary values as pixel values outside the contour segment therein;

means for substituting the second binary values outside the contour segment within each of the minimum subblocks with first padded values to form a padded minimum subblock, thereby producing a plurality of padded minimum subblocks;

means for replacing the second binary values outside each of the padded minimum subblocks with second padded values to form a corresponding padded remaining subblock remained in said each of the second contour blocks, thereby providing a multiplicity of corresponding padded remaining subblocks; and means for combining said each of the padded minimum subblocks and the corresponding padded remaining subblock to form a padded contour block, thereby providing a multiplicity of padded contour blocks.

17. The apparatus according to claim 16, wherein the first padded values are generated by using a distance weighted mean padding method based on the pixel values inside the contour segment in said each of the minimum subblocks.

18. The apparatus according to claim 17, wherein the second padded values are generated by using a repetitive padding method based on the pixel values in said each of the padded minimum subblocks.

19. The apparatus according to claim 11, wherein said means for encoding the padded contour blocks and the object blocks includes:

means for transform coding each of the padded contour blocks and each of the object blocks, thereby providing sets of transform coefficients;

means for quantizing the sets of transform coefficients, thereby providing sets of quantized transform coefficients; and means for entropy coding the sets of quantized transform coefficients, thereby providing the encoded texture signal of the image signal.

* * * * *